No. 817,236. PATENTED APR. 10, 1906.
N. FOERSTER & D. J. CAREY.
FILLING REPLENISHING MECHANISM FOR LOOMS.
APPLICATION FILED JUNE 16, 1903.

No. 817,236. PATENTED APR. 10, 1906.
N. FOERSTER & D. J. CAREY.
FILLING REPLENISHING MECHANISM FOR LOOMS.
APPLICATION FILED JUNE 16, 1903.

WITNESSES:
INVENTORS:
Norbert Foerster and Daniel J. Carey,
By Attorneys,

No. 817,236. PATENTED APR. 10, 1906.
N. FOERSTER & D. J. CAREY.
FILLING REPLENISHING MECHANISM FOR LOOMS.
APPLICATION FILED JUNE 16, 1903.

WITNESSES:
Fred White
Rene Bruine

INVENTORS:
Norbert Foerster & Daniel J. Carey,
By Attorneys,

UNITED STATES PATENT OFFICE.

NORBERT FOERSTER AND DANIEL J. CAREY, OF NEW YORK, N. Y.; SAID CAREY ASSIGNOR OF ONE-FIFTH OF HIS RIGHT TO SAID FOERSTER AND FOUR-FIFTHS OF HIS RIGHT TO AMERICAN TEXTILE SPECIALTY MACHINERY COMPANY, OF NEW YORK, N. Y., A CORPORATION OF NEW YORK.

FILLING-REPLENISHING MECHANISM FOR LOOMS.

No. 817,236.  Specification of Letters Patent.  Patented April 10, 1906.

Application filed June 16, 1903. Serial No. 161,668.

*To all whom it may concern:*

Be it known that we, NORBERT FOERSTER and DANIEL J. CAREY, citizens of the United States, residing in the borough of Manhattan, city, county, and State of New York, have jointly invented certain new and useful Improvements in Filling-Replenishing Mechanism for Looms, of which the following is a specification.

Our invention aims to provide a mechanism for automatically replenishing the filling or weft when a shuttle is exhausted or the weft breaks. The specific mechanism shown supplies a new-filled shuttle and ejects the old empty or partly-empty shuttle; but there are mechanisms known which merely insert new filling in the same shuttle, and our invention is applicable, broadly, to any such system or any similar system for replenishing the weft. The invention provides a mechanism for this purpose which requires the expenditure of very little work and which operates with certainty and regularity and which, furthermore, can be readily applied to existing looms.

Various other points of advantage are referred to in detail hereinafter.

The accompanying drawings illustrate a loom in which the invention is embodied.

Fig. 3ª is a section on the line 3ª of Fig. 3.

The invention includes a motor device which is brought into operative relation with the complementary parts of the mechanism automatically on exhaustion of the thread in the shuttle to a predetermined extent or on breakage of the weft. The controlling means for bringing the motor device into such operative relation preferably receives the movement of the lay, so as to be positively operated synchronously with and at exactly a determined point in the movement of the lay. The motor device is preferably a continuously-driven element—such, for example, as a rotating cam—and it is preferably brought into operative relation by moving into its path an arm which upon being moved by the cam directly accomplishes the replenishing of the filling. Obviously the same result might be secured in other ways within the skill of a mechanic to devise. Various means for bringing mechanism into operation on the complete or partial exhaustion of the thread in the shuttle and on the breakage of the thread are known. In case of breakage of thread we may use any suitable weft-fork. When the weft is exhausted, we prefer to use a detector carried by the shuttle, so as to secure a positive and certain operation, whether by the transmission of the movement of the lay to the controlling means or otherwise.

The immediate means for exchanging shuttles may be varied without departing from the broad invention. For example, we may use the pivoted shuttle-box of the patent of Brun, Brun, and Bicking, No. 714,665, of December 2, 1902, or any one of a number of other known mechanisms for this purpose. Preferably, however, we use a shuttle-box which reciprocates vertically bodily and underneath which is an auxiliary shuttle-box movable with it, the two boxes being raised at the proper time, so that the lower box catches the exhausted shuttle and the upper box at the same time receives a full shuttle, whereupon they are lowered and the full shuttle is driven across the lay and the exhausted shuttle discharged.

It is also within our invention to transmit any or all of the several movements referred to from the weft-detecting device to the replenishing devices by electrical as well as mechanical means.

Referring to the drawings, A indicates any suitable continuously-rotating shaft of the loom, and on this shaft is a cam B, constituting a motor device. An arm C is mounted on a rocking shaft D and is pivoted at E, so that it may swing in the plane of said shaft and so that its roller E' may be brought into or out of the path of the cam B. A spring F holds the arm normally out of the path of the cam, and a chain or other suitable connection G serves as a controlling means for swinging the arm C, so as to bring it and the cam B into operative relation, whereupon the shaft D is rocked and the shuttles exchanged, as hereinafter described. In the illustrated apparatus the shaft D and connected parts (shown best in Figs. 3, 4, and 5) constitute the complementary parts with which the cam B is brought into operative relation by the swinging of the lever C. Means for controlling the movement of the arm C is preferably resilient, as by the inclusion of a spring H of greater strength than the spring F, so that the movements of the arm C will be accomplished without jar or shock and so that the chain G may be moved a greater distance than necessary without injury. The chain G or equivalent motion-transmitting means is connected at its upper end with the slide J, the inner end of which is in position to be struck by an actuator on the lay at the proper moment, so as to transmit the movement of the lay to the arm C. The cam B is provided with the flange K, extending around the operative portion thereof, which engages the roller E' and prevents it from moving back to its inoperative position until the cam has completed its work, after which the roller comes into engagement with the unflanged portion of the cam and is released and drawn away by the spring F. The roller E' or other equivalent part of the arm C is adjustably connected to the main portion of the arm, as by the slot and bolt shown, so as to permit of varying the amount of movement of the shaft D and of the shuttle-exchanging devices.

Figs. 2, 3, 4, and 11 illustrate best the shuttle-exchanging devices. The lay L is extended to form a frame or housing M at the front and rear, between which reciprocates vertically a movable shuttle-box N. Also fixed to the lay is a shuttle-carrier or maga-
zine O for carrying full shuttles one above another. This magazine is held in fixed position a distance above the shuttle-box about equal to the depth of the latter. The movable shuttle-box N carries underneath it an auxilary shuttle-box P, which moves with it. Each of these shuttle-boxes is provided with a swell Q at the back operating as usual in combination with the stop-motion device R. The swells Q are pivoted at their outer ends and pressed inward by the leaf-springs shown. At their inner ends they bear against a pair of wedges m and n on the lay-frame. As the shuttle-box is raised the upper swell Q is pressed out by the wedge m to leave a free passage for the admission of the new shuttle dropped into the box from the magazine, the swell Q of the lower box P being then operative. As the box is lowered the upper swell Q passes below the wedge m and the lower swell rides up on the wedge n, thus releasing the exhausted shuttle, as hereinafter explained. In each case the swell of the box which receives the running shuttle is free to move inward under the action of its spring, and thus engage said shuttle, and the other is held fixedly open, so that it cannot obstruct a shuttle moving into its box (in the case of the upper shuttle) or prevent the shuttle falling out, (in the case of the lower box.) Fig. 6 illustrates this mechanism most plainly, the parts being shown with the shuttle-box in the raised position.

Figures 9, 10, 11, 12:
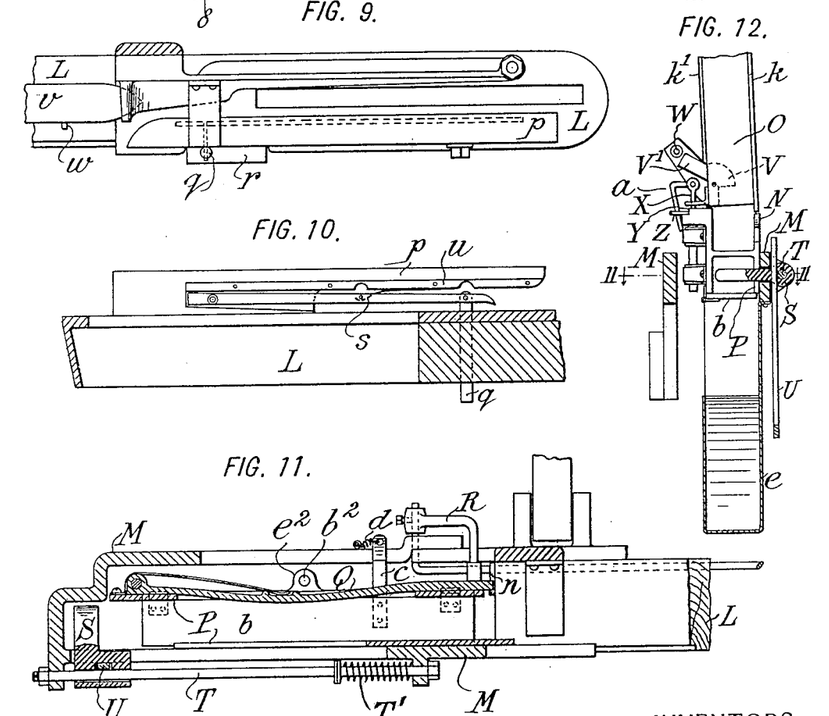
Fig. 9 is a plan of the same.
Fig. 10 is a vertical longitudinal section of the same on the line 10 10 of Fig. 8.
Fig. 11 is a horizontal section of the movable shuttle-box approximately on the line 11 11 of Fig. 12.
Fig. 12 is a section of the same approximately on the line 12 12 of Fig. 3.
Figure 13:
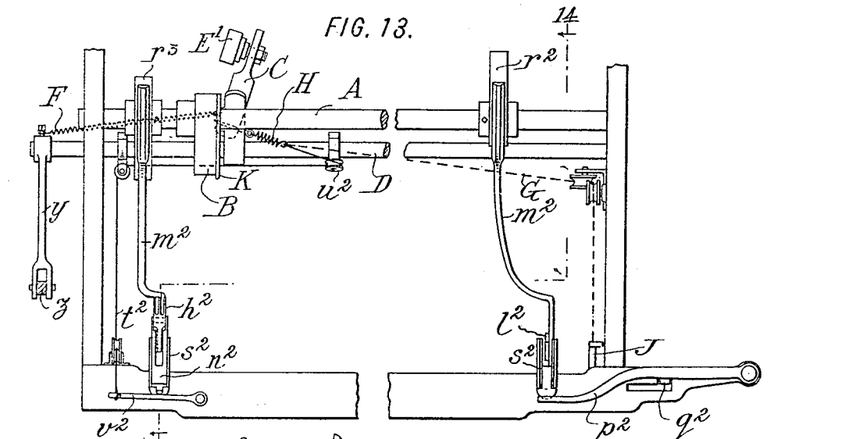
Figs. 13 and 14 are respectively a plan and a section on line 14 14 of Fig. 13, illustrating the mechanism for replenishing the filling or for stopping the loom upon the breaking of the weft-thread and omitting various parts of the mechanism which might confuse the figures.
Figure 14:
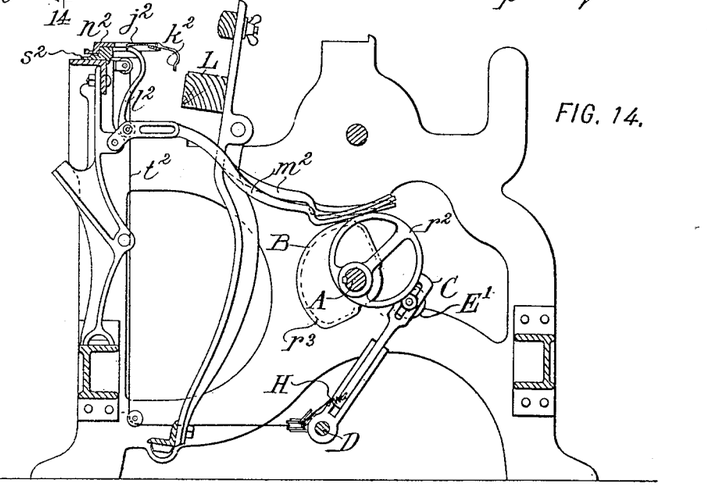
Figure 15:
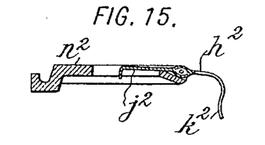
Figs. 15 and 16 are respectively a section and a plan of a weft-fork adapted for use in the mechanism of Figs. 13 and 14.
Figure 16:
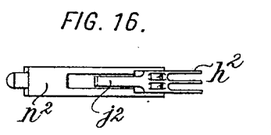

The picker S projects laterally through a slot in the front wall of the frame M, as shown best in Figs. 11 and 12, being guided on a horizontal rod T, fastened to the frame, and having a spring-buffer T' at its inner end and being moved by the usual picker-stick U. In its retracted position the picker S is beyond the end of the shuttle-boxes N and P, so that it does not interfere with their rising and falling movement.

The shuttles v are held in the shuttle-carrier O by means of forked levers V, which engage the tapered ends of the shuttles and which are connected together by a heavy rod W at their outer ends, so as to counterweight these ends and maintain them normally downward. The levers are provided with stops—such, for example, as the plates V' (shown in Fig. 12)—riveted on their outer ends, which in the upward movement of the outer ends of the levers strike against the rear of the magazine O, so as to limit the upward movement. Each of the arms is provided with a pin X, hanging down and suitably guided and held in position to be engaged by a rearwardly-projecting portion Y of the upper shuttle-box N as the latter is raised and to be thereby tilted to the position shown to drop the lowest shuttle from the reservoir into the shuttle-box N and to hold up the remaining shuttles. When the shuttle-box is lowered, the weight W brings the outer ends of the levers down again and their inner ends up, so as to engage the lowest shuttle in the receptacle in the forks of the levers ready for the next operation. In order to prevent the shuttle jumping out of the box N during normal running, the latter is provided with the cover-plate Z, passing through a slit in the rear side of the box, and on the outside portion a pair of apertures through which pass wire cams $a$, fixed on the back of the receptacle. As the box is raised these cams withdraw the cover-plate to permit the entrance of a shuttle from the magazine, and as the box is lowered the cams $a$ force the plate Z inward again.

It is on the beating-up movement of the lay that the boxes N and P are raised and while the shuttle is in the fixed shuttle-box at the opposite side of the machine. On the next shoot of the shuttle it enters the auxiliary box P, a new shuttle entering the box N at the same time. During the next beat the boxes N and P are dropped and the new shuttle in the box N comes into the path of the picker and is put into regular operation. The auxiliary shuttle-box P is provided with a bottom plate $b$, hinged at its rear edge and having a rearwardly-projecting arm $c$, attached to a spring $d$, Figs. 4 and 5, which tends to close the bottom. When the box is in its normal lowered position, however, the arm $c$ bears on the edge of the rear portion of the frame M, and thus holds the bottom open. Therefore when the box is raised to receive the exhausted shuttle the bottom $b$ is closed by means of the spring $d$, and when it has received the exhausted shuttle and has dropped into the normal running position the bottom is swung open and the shuttle drops out into a sheet-metal chute $e$, which guides it to one side of the machine.

The shuttle-receptacle O is preferably constructed of channel-bars $f$ at the ends, united at the rear by a plate $g$ and united at the inner end to a plate $h$, which is attached to the lay and carries also the cams $m$ $n$. At the outer end the channel-bar $f$ is supported by means of a brace $j$, extending to the outer end of the frame M and the lower part of which supports the outer end of the chute $e$. Guide rods or bars $k$ $k'$ are provided at the front and rear, respectively, those at the front being lower, as shown, to facilitate the insertion of shuttles from the front of the machine. The ends are braced at the rear by a rod $l$. The rod $k^3$ is for attachment of the ends of the shuttle-threads.

At the opposite end of the lay there is preferably a fixed shuttle-box $p$. (Shown in Figs. 7 to 10.) On the lay at this side is provided an actuator for the slide J, said actuator consisting of a pin $q$, sliding vertically in a plate $r$ on the face of the lay L and normally held upward by means of a spring-pressed pivoted arm $q'$. The pin $q$ is pivoted at its upper end to a swinging arm $s$, pivoted at its outer end and downwardly beveled at its inner end, as shown, and normally held up by a leaf-spring $t$, engaging a pin on the side of the arm. This pivoted arm is just inside of the front wall of the shuttle-box, and immediately above it is a horizontal rib, which may be an edge of a slot in the shuttle-box wall or may be a separate member $u$.

Figure 1:
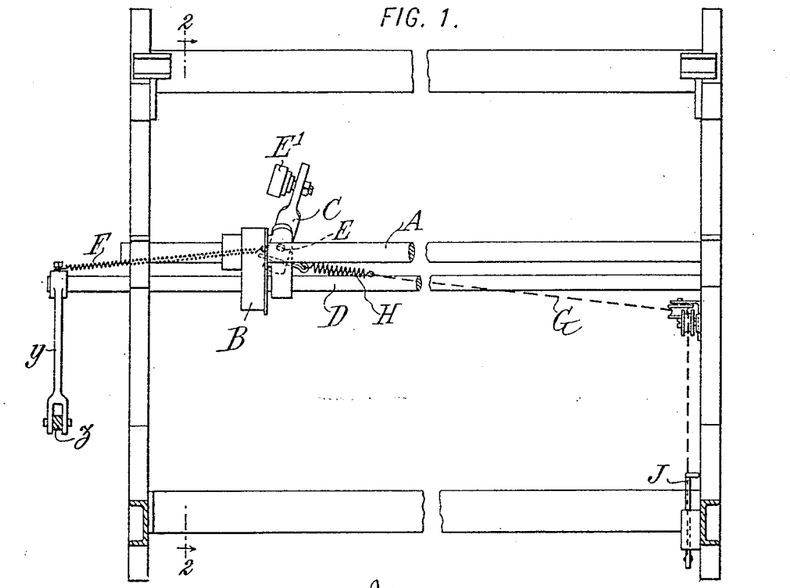
Figure 1 is a plan of the principal operating parts, shown in relation to the frame of the machine.
Figure 2:
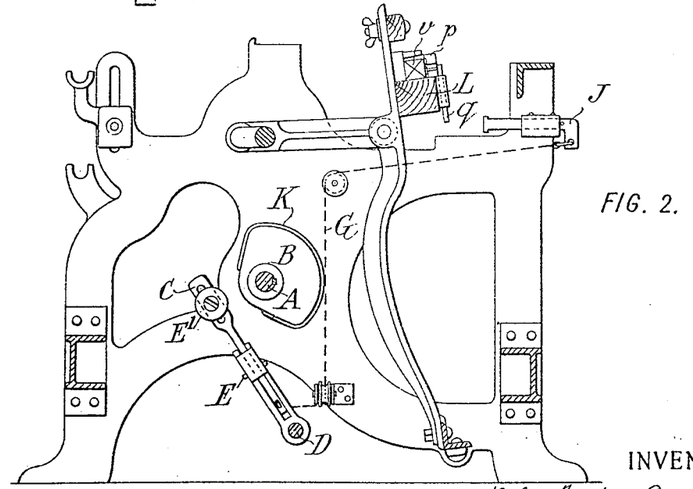
Fig. 2 is a transverse section of the same on the line 2 2 of Fig. 1.

The shuttle may be of any suitable type, carrying a detector—such, for example, as that shown in patent of Brun and Brun, No. 648,547, dated May 1, 1900. Such a shuttle is shown at $v$ with a detector, consisting of a pin $w$, projecting out of the side of the same. As the shuttle flies into the box $p$ the detector $w$ runs between the rib $u$ and the pivoted arm $s$, and as it approaches the pivot of the latter presses down its free end and projects the actuating-pin $q$ below the batten and into position to strike the slide J. This position of the parts is represented in Fig. 2. It is understood that the detector $w$ only projects to its operative position when the shuttle-thread is nearly exhausted, and, as usual, when the lay is in its backward position. Then when the lay beats up the actuating-pin $q$ strikes the slide J and throws the arm C over to bring the roller E' into the path of the cam B. The cam immediately rocks the arm C, and with it the shaft D, which raises the movable shuttle-box. The raising of the movable shuttle-box brings the auxiliary lower box into running position, so that it receives the running shuttle and at the same time supplies a new full shuttle to the upper box. The projecting portion of the cam B then passes the roller E', and the weight of the movable shuttle-box brings it down to the normal position with a new shuttle, as explained. The downward movement may be facilitated by the use of a spring $g^2$, though this is not essential, the weight of the bodily-movable box being ordinarily sufficient. The entire mechanism is very simple and is very sensitive. The detector in the shuttle is not itself much strained in pressing down the actuating-pin $q$, since it is merely a wedge between the rib $u$ and the pivoted arm $s$. The actuating-pin $q$ has very light work to accomplish in transmitting the movement of the lay to the light flexible connection G and to the arm C. The heavy work—the lifting of the movable shuttle-box—is done from the power-shaft A and does not, therefore, affect any of the elements of the loom proper. It is within our invention to even further lighten the work of the detector in the shuttle or the actuator carried by the lay, or both, by transmitting the necessary impulse to the arm C through electrical connections to an electromagnet operating on the arm C. A specific example of such a mechanism is disclosed and claimed in the application for patent of N. Foerster, Serial No. 160,144, filed June 5, 1903.

Figures 3, 3A:
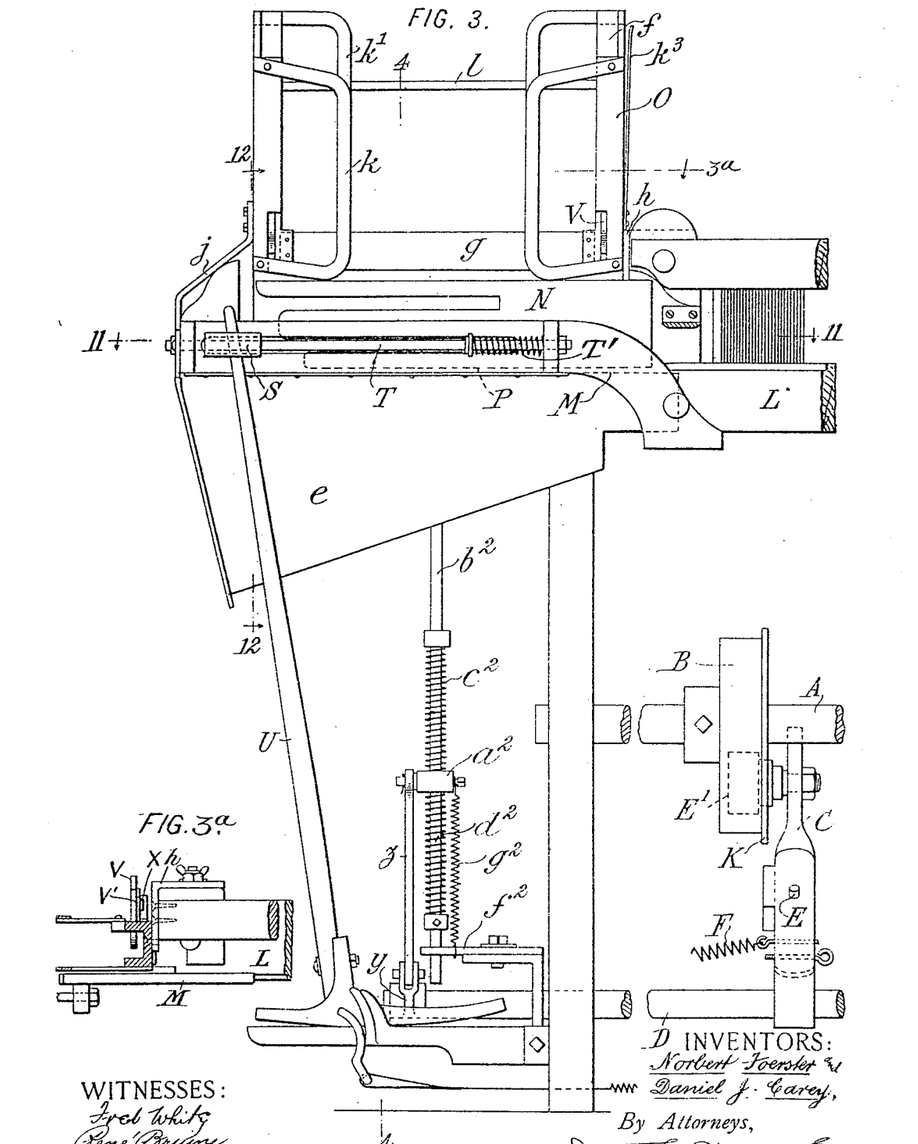
Fig. 3 is a front view of the mechanism at the side of the loom at which the shuttles are exchanged.
Figures 4, 5, 6:
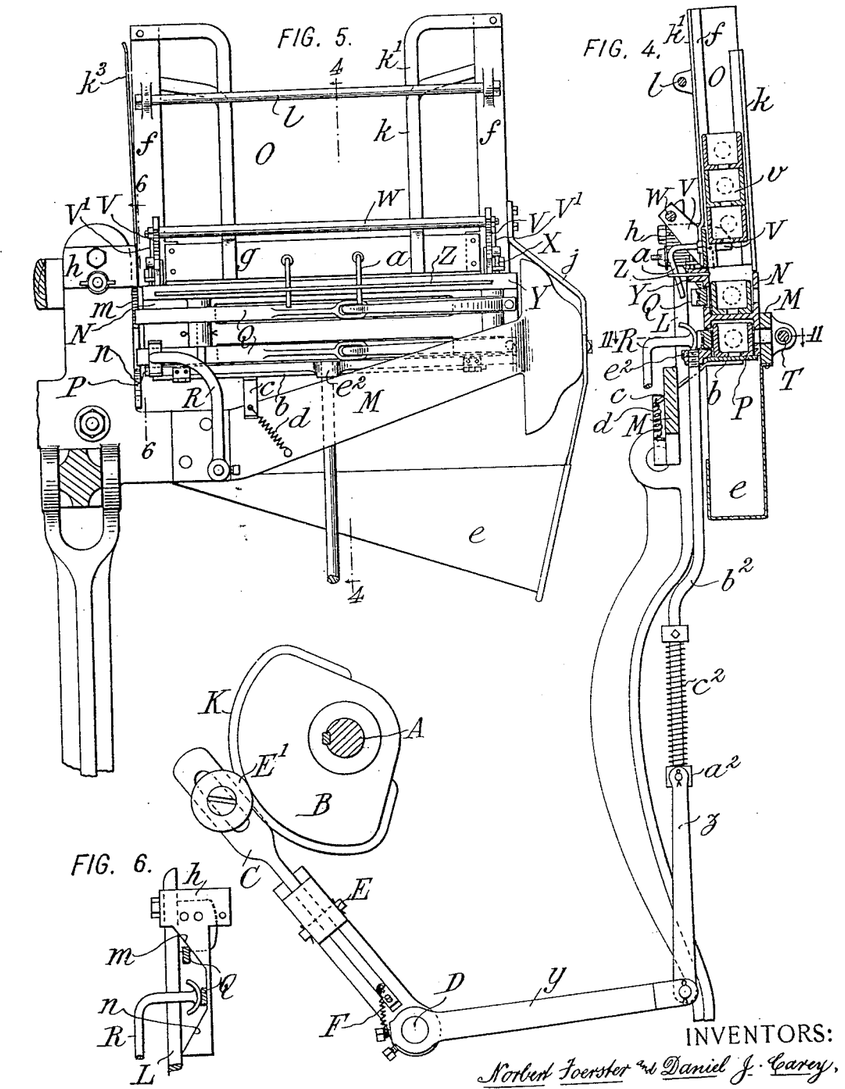
Fig. 4 is a section approximately on the line 4 4 of Figs. 3 and 5.
Fig. 5 is a rear view of the movable shuttle-box.
Fig. 6 is a section on the line 6 6 of Fig. 5.
Figure 7:
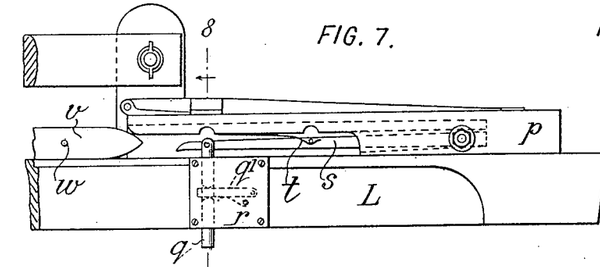
Fig. 7 is a front view of the fixed shuttle-box.
Figure 8:
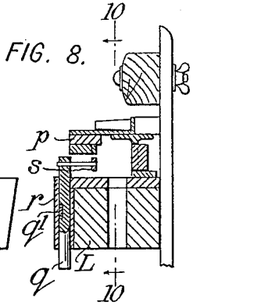
Fig. 8 is a section of the same on the line 8 8 of Fig. 7.

The mechanism for transmitting the movement of the rock-shaft D to the movable shuttle-box is preferably as shown in Figs. 3 and 4. An arm $y$ on the end of the shaft D carries at its free end a link $z$, the upper end of which is pivoted to a sleeve $a^2$, which is freely mounted on the rod $b^2$ between springs $c^2$ $d^2$, yieldingly pressing said link $z$ in opposite directions, the rod $b^2$ being connected at its upper end to a lug $e^2$ at about the center of the rear portion of the movable shuttle-box. The rod $b^2$ may be guided at its lower end in a bracket $f^2$. A spring $g^2$ may be connected to the sleeve $a^2$ and any fixed point, such as the bracket $f^2$, to exert a downward pull on the shuttle-box; but ordinarily such a spring $g^2$ will not be necessary.

Another feature of improvement which our invention introduces is the automatic replenishing of the filling upon the breaking of the weft-thread. Thus with our complete machine either a breaking of the thread or an exhaustion of the thread in the shuttle may be utilized to supply a new shuttle. The old shuttle is thrown out, and if the weft has broken, leaving a quantity of thread in the shuttle, the shuttle thrown out may be immediately returned into the top of the magazine, or it may be refilled. Of course if the weft breaks at a point half-way across the web half of the pick will be lacking. For the finest goods this may be objectionable, and we preferably arrange our loom so that it may be adapted either for cheap goods, inserting a new shuttle without stopping the machine, as above explained, or for fine goods, stopping the loom when the weft breaks, so as to permit the withdrawal of the incomplete pick. Figs. 13 to 16 illustrate this mechanism, omitting the means for controlling the filling-replenishing mechanism from the shuttle. The usual or any other suitable weft-fork $h^2$ may be used in order to detect a break in the filling or weft. Ordinarily such a weft-fork is placed at the right of the machine at the point indicated in Fig. 13, and when its front arm $j^2$ is not lifted by the pressure of a weft-thread against the rear arm $k^2$ said front arm $j^2$ is struck by the advancing end $l^2$ of the lever $m^2$, and the slide $n^2$, upon which the fork is carried, moves forward on its guide-plate and pushes forward the arm $p^2$, which in turn pushes the stopping or belt-shifting lever $q^2$ out of the notch in which it stands, and a spring throws it over in a direction to shift the belt and stop the loom. The lever $m^2$ is operated intermittently by the cam $r^2$ on the cam-shaft A of the loom. According to our invention it is proposed to use such a weft-fork for the purpose of controlling the weft-replenishing mechanism, and preferably, also, to adapt the machine for the transferring of the weft-fork from one mechanism to another, so that it may be used either for controlling the weft-replenishing mechanism or for its usual purpose of controlling the shifting lever, and thus stopping the loom. For this purpose the weft-fork when it is to control the filling-replenishing mechanism should be at the left of the machine, and therefore we preferably provide two cams $r^2$ and $r^3$ and levers $m^2$ at opposite sides of the machine and provide also suitable guides $s^2$ from one to the other of which the weft-fork may be easily transferred. The means for controlling the weft-replenishing mechanism from the weft-fork may be any suitable means. Preferably we use the means previously described, in which the cam B rocks the arm C on the shaft D and eventually discharges the running shuttle and substitutes a new one therefor. The movement of the weft-fork slide $n^2$ may be transmitted, for example, by means of a chain or cord $t^2$, passing from the pivoted arm $v^2$ in the path of the slide $n^2$ over suitable pulleys on the frame of the machine and on the shaft D and running finally from the pulley $u^2$ to the inner end of the arm C. The cam $r^3$ is of somewhat different shape from the cam $r^2$, so as to throw the weft-fork, and consequently the lever C, quickly and to hold the lever for a long period in the path of the cam B to insure engagement by the latter. As stated above, the flange K of the cam B holds the roll E' of the lever C in engagement with the cam during the desired interval. The cam $r^2$ has only to throw the shifting lever, which may be done at any time, and there is no need for a prolonged dwell.

Though we have described with great particularity of detail a mechanism embodying our invention, yet it is to be understood that the invention is not limited to the specific mechanism disclosed. Various modifications thereof in detail and in the arrangement and combination of the parts may be made by those skilled in the art without departure from the invention.

What we claim is—

1. In an automatic filling-replenishing mechanism for looms the combination of a member carried by a driven shaft and normally disconnected from the complementary parts of the mechanism, controlling means for bringing the same into operative relation with the complementary parts of said mechanism, an actuator carried by the lay adapted when in its operative position to transmit the movement of the lay to the controlling means, and a detector carried by the shuttle and adapted on exhaustion of the thread to a predetermined extent to cause a movement of said actuator to its operative position.

2. In an automatic filling-replenishing mechanism for looms the combination of a continuously-driven cam, an arm adapted to be actuated by said cam to replenish the filling, and means for transmitting a movement of the lay to a portion of said arm to move the same into the path of said cam upon the first beat up of the lay after the exhaustion of the thread to a predetermined extent.

3. In an automatic filling-replenishing mechanism for looms, the combination of a continuously-driven cam, an arm adapted to be actuated by said cam to replenish the filling, means for transmitting the movement of the lay to a portion of said arm to move the same into the path of said cam upon the first beat up of the lay after the exhaustion of the thread to a predetermined extent, and a spring tending to withdraw the arm from the path of the cam to render the mechanism inoperative.

4. In an automatic filling-replenishing mechanism for looms the combination of a continuously-driven cam, an arm adapted to be actuated by said cam to replenish the filling, means for transmitting a movement of the lay to said arm to move the latter into the path of said cam upon the first beat up of the lay after the exhaustion of the thread to a predetermined extent, a spring tending to withdraw the arm from the path of the cam, and means for holding the arm in engagement with the cam until the movement of the cam is completed.

5. In an automatic filling-replenishing mechanism for looms the combination of a continuously-driven cam, an arm adapted to be actuated by said cam to replenish the filling, means for transmitting a movement of the lay to said arm to move the arm laterally into the path of said cam upon the first beat up of the lay after the exhaustion of the thread to a predetermined extent, a spring tending to withdraw the arm laterally from the path of the cam, and a flange holding the arm in engagement with the cam throughout the effective movement thereof.

6. In an automatic filling-replenishing mechanism for looms the combination of a member carried by a driven shaft, and resilient controlling means for bringing the same into operative relation with the complementary parts of the mechanism automatically on exhaustion of the thread to a predetermined extent.

7. In an automatic filling-replenishing mechanism for looms the combination of a member carried by a driven shaft, resilient controlling means for bringing the same into operative relation with the complementary parts of the mechanism, and means for transmitting the movement of the lay to said controlling means automatically on exhaustion of the thread to a predetermined extent.

8. In an automatic filling-replenishing mechanism for looms the combination of a member carried by a driven shaft and normally disconnected from the complementary parts of the mechanism, controlling means for bringing the same into operative relation with the complementary parts of said mechanism, an actuator adapted to be projected from the lay automatically on exhaustion of the thread to a predetermined point and when so projected to strike and operate said controlling means.

9. In an automatic shuttle-exchanging mechanism for looms the combination of a receptacle for full shuttles having a rear plate $g$, a vertically-movable shuttle-box below said receptacle, means for raising said shuttle-box to said receptacle to receive a full shuttle therefrom, a normally closed cover for said box, and cams $a$ comprising parallel bent rods attached to said plate $g$ and engaging said cover to open the same as the box is raised.

10. In an automatic shuttle-exchanging mechanism for looms, the combination of the lay, a movable shuttle-box at one end of said lay, an auxiliary box adapted to be moved into the normal position of said shuttle-box, a swell carried by said auxiliary box, said swell being in operative position when said auxiliary box is moved to the normal position of said shuttle-box, and means for withdrawing said swell as said auxiliary box is moved from said position.

11. In an automatic filling-replenishing mechanism for looms, the combination of the lay, a movable shuttle-box at one end of said lay, an auxiliary box, means for moving said shuttle-box to a position to receive a fresh shuttle, and simultaneously moving said auxiliary box to a position to receive the running shuttle, a swell carried by each of said boxes, the box which receives the running shuttle having its swell always free to act, and means for always holding the other swell fixedly open.

12. In an automatic shuttle-exchanging mechanism for looms, the combination of a receptacle for full shuttles, forked levers engaging the ends of the shuttles and connected together, and a counterweight comprising a bar W connecting them together at their outer ends.

13. In an automatic shuttle-exchanging mechanism for looms, the combination with an auxiliary shuttle-box for receiving the exhausted shuttle, of a bottom plate $b$ therefor hinged at its edge and having a projecting arm $c$, a spring $d$ for holding said bottom closed, and means for engaging said arm and opening said bottom when the box is moved to position to discharge the shuttle.

14. In an automatic shuttle-exchanging mechanism for looms, the combination of a vertically-movable shuttle-box, an arm $y$ and means for rocking the same, a rod $b^2$ connected to said shuttle-box, a link $z$ connected to said arm $y$ and slidably connected to said rod $b^2$, and springs $c^2$ and $d^2$ on said rod yieldingly pressing said link $z$ in opposite directions.

In witness whereof we have hereunto signed our names in the presence of two subscribing witnesses.

NORBERT FOERSTER.
    DANIEL J. CAREY.

Witnesses:
 FRED WHITE,
 DOMINGO A. USINA.